(12) United States Patent
Iwasaki et al.

(10) Patent No.: US 8,629,922 B2
(45) Date of Patent: Jan. 14, 2014

(54) IMAGE CAPTURING APPARATUS AND METHOD OF CONTROLLING THE SAME

(75) Inventors: Takahiro Iwasaki, Kiyose (JP); Yoshihiro Mizuo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/358,631

(22) Filed: Jan. 26, 2012

(65) Prior Publication Data

US 2012/0200738 A1 Aug. 9, 2012

(30) Foreign Application Priority Data

Feb. 8, 2011 (JP) ................................ 2011-025336

(51) Int. Cl.
*H04N 5/76* (2006.01)
*H04N 5/222* (2006.01)

(52) U.S. Cl.
USPC .................. 348/231.2; 348/231.1; 348/231.3; 348/231.5; 348/333.01; 348/333.05

(58) Field of Classification Search
USPC .................. 348/231.2–231.5, 333.01, 333.05
See application file for complete search history.

(56) References Cited

U.S. PATENT DOCUMENTS

| 7,518,640 | B2 * | 4/2009 | Nakajima et al. | ........... 348/231.2 |
| 7,668,400 | B2 * | 2/2010 | Widdowson et al. | ......... 382/276 |
| 2002/0059322 | A1 * | 5/2002 | Miyazaki et al. | ............. 707/200 |
| 2005/0270585 | A1 * | 12/2005 | Higuchi | ......................... 358/296 |
| 2006/0177194 | A1 * | 8/2006 | King et al. | ........................ 386/46 |
| 2006/0290788 | A1 * | 12/2006 | Ohtsuka et al. | ............. 348/231.3 |
| 2008/0007631 | A1 * | 1/2008 | Abe | ............................. 348/231.3 |
| 2008/0052945 | A1 * | 3/2008 | Matas et al. | ..................... 34/173 |
| 2009/0142003 | A1 * | 6/2009 | Fukuda | ......................... 382/286 |

FOREIGN PATENT DOCUMENTS

| JP | 2002-111995 | 4/2002 | |
| JP | 2002111995 A | * 4/2002 | ............. H04N 1/387 |
| JP | 2004-274500 | 9/2004 | |
| JP | 2008-017238 | 1/2008 | |

* cited by examiner

*Primary Examiner* — Nhan T Tran
*Assistant Examiner* — Xi Wang
(74) *Attorney, Agent, or Firm* — Cowan, Liebowitz & Latman, P.C.

(57) ABSTRACT

An image capturing apparatus comprises an imaging unit which performs an imaging process of an object image; an image storage unit which stores the image data linked with album data; a layout storage unit which stores layout information representing a position where the image data linked with the album data is displayed on a page of the album data; an album display unit which displays an image frame at the position on the page of the album data represented by the layout information; and a designation unit which receives a designation of an arbitrary position on the displayed page, wherein when a region outside the image frame is designated, the album display unit displays the captured image data on a background of the page as a live view, and the image storage unit stores the image data linked as the background of the page of the album data.

12 Claims, 19 Drawing Sheets

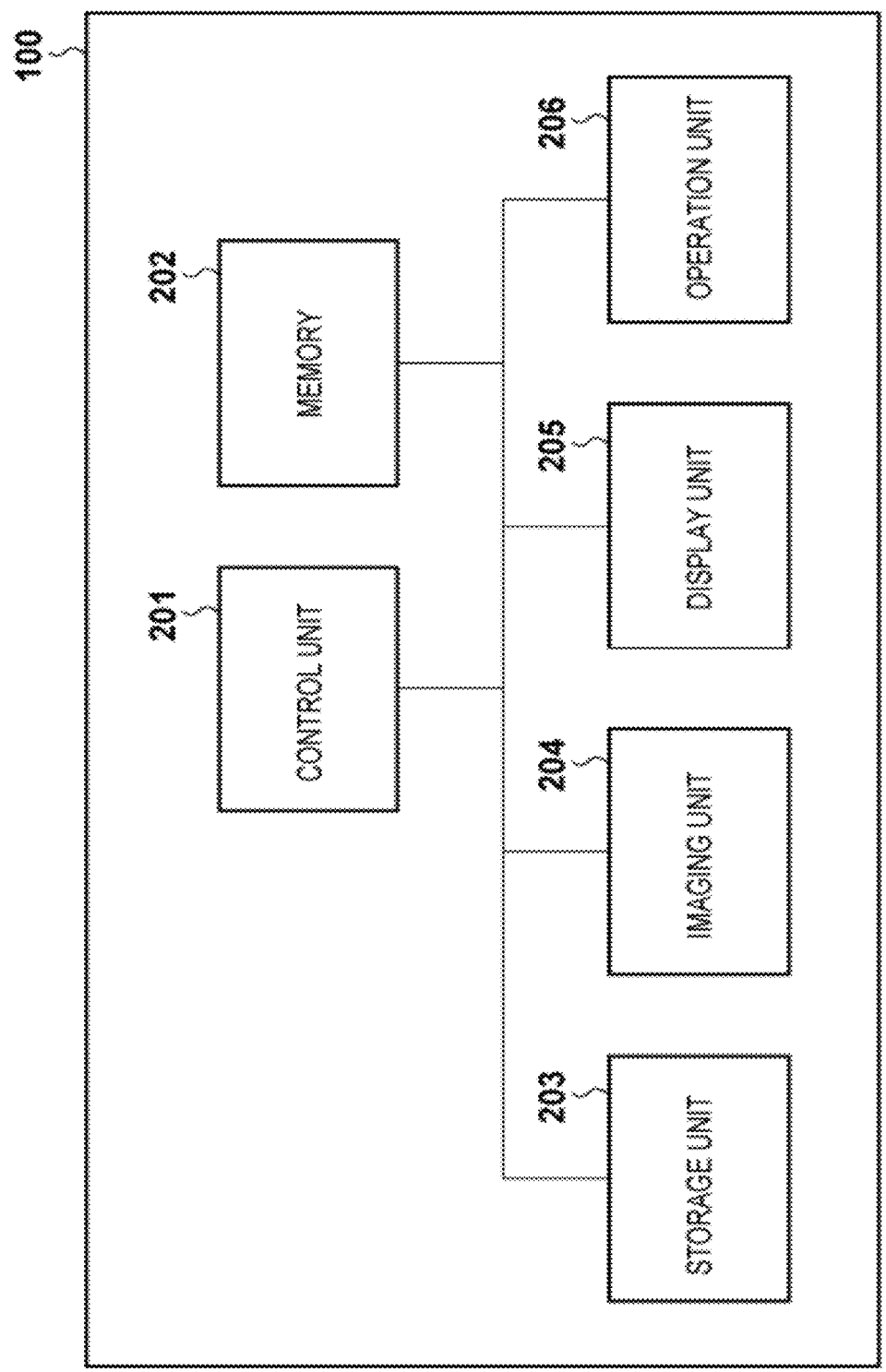

F I G. 4A

```
<?xml version="1.0" standalone="no"?>
<!DOCTYPE svg PUBLIC "-//W3C//DTD SVG 1.0//EN"
"http://www.w3.org/TR2000/REC-SVG-20010904/DTD/svg10.dtd">
<svg width="600" height="400">
<status> EDITABLE </status>
<title> TRAVEL TO HAWAII </title>                                      — 410
                                            — 411
<background brightness="" mode="" xlink:href="">                       — 412
<image id="1" x="" y="" width="" height="" xlink:href="IMG_0029.JPG"/>  — 413
<image id="2" x="△△" y="△△" width="△△" height="△△" xlink:href="IMG_0030.JPG"/>

<background brightness="" mode="" xlink:href="">
<image id="3" x="□□" y="□□" width="□□" height="□□" xlink:href=""/>     — 414
<image id="4" x="□□" y="□□" width="□□" height="□□" xlink:href=""/>

:

</svg>
```

FIG. 4B

```
<?xml version="1.0" standalone="no"?>
<!DOCTYPE svg PUBLIC "-//W3C//DTD SVG 1.0//EN"
"http://www.w3.org/TR/2001/REC-SVG-20010904/DTD/svg10.dtd">
<svg width="600" height="400">
  <status> EDITABLE </status>
  <title> TRAVEL TO HAWAII </title>

<background brightness="" mode="" xlink:href="">
    <image id="1" x="*" y="*" width="* *" height="* *" xlink:href="IMG_0029.JPG"/>
    <image id="2" x="△" y="△△" width="△△" height="△△" xlink:href="IMG_0030.JPG"/>

<background brightness="" mode="" xlink:href="">
    <image id="3" x="□□" y="□□" width="□□" height="□□" xlink:href="IMG_0031.JPG"/>
    <image id="4" x="□□" y="□□" width="□□" height="□□" xlink:href=""/>

...

</svg>
```

```xml
<?xml version="1.0" standalone="no"?>
<!DOCTYPE svg PUBLIC "-//W3C//DTD SVG 1.0//EN"
"http://www.w3.org/TR/2000/REC-SVG-20010904/DTD/svg10.dtd">
<svg width="600" height="400">
<status> EDTABLE </status>
<title> TRAVEL TO HAWAII </title>

<background brightness="0" mode="1" xlink:href= "IMG_0032.JPG"/>
<image id="1" x="*" y="* *" width="* *" height="* *" xlink:href= "IMG_0029.JPG"/>
<image id="2" x="△△" y="△△" width="△△" height="△△" xlink:href= "IMG_0030.JPG"/>

<background brightness="" mode="" xlink:href= ""/>
<image id="3" x="□□" y="□□" width="□□" height="□□" xlink:href= "IMG_0031.JPG"/>
<image id="4" x="□□" y="□□" width="□□" height="□□" xlink:href= ""/>

:
  :

</svg>
```

```
<?xml version="1.0" standalone="no"?>
<!DOCTYPE svg PUBLIC "-//W3C//DTD SVG 1.0//EN"
"http://www.w3.org/TR/2000/REC-SVG-20010904/DTD/svg10.dtd">
<svg width="600" height="400">
<status> EDITABLE </status>
<title> TRAVEL TO HAWAII </title>
            440      441      442
<background brightness="0" mode="2" pagespan="2" xlinkhref="IMG_0032.JPG"/>
<image id="1" x="*" y="*" width="" height="" xlinkhref="IMG_0029.JPG"/>
<image id="2" x="△△" y="△△" width="△△" height="△△" xlinkhref="IMG_0030.JPG"/>

<image id="3" x="□□" y="□□" width="□□" height="□□" xlinkhref="IMG_0031.JPG"/>
<image id="4" x="□□" y="□□" width="□□" height="□□" xlinkhref=" "/>

:

</svg>
```

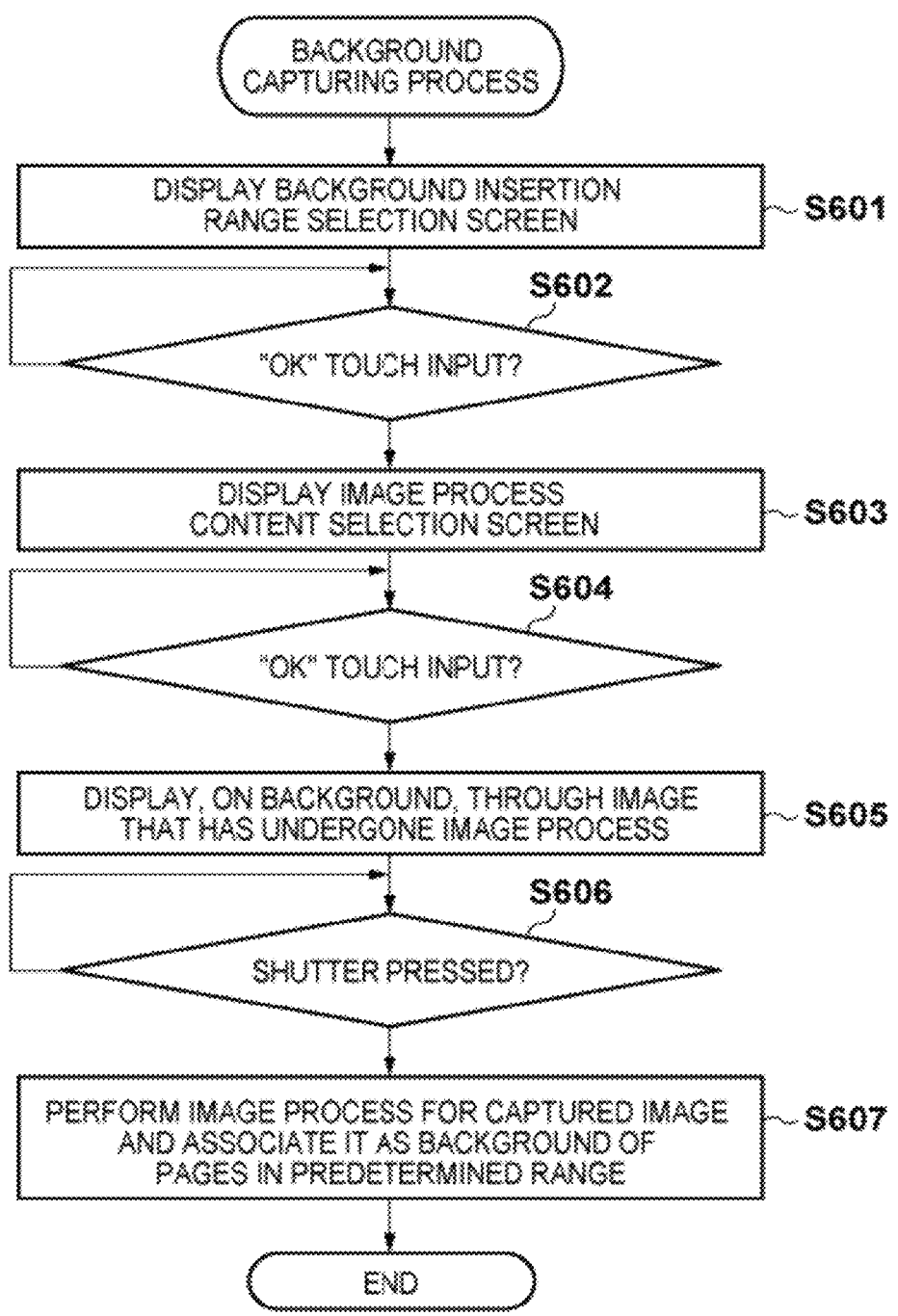

F I G. 11C
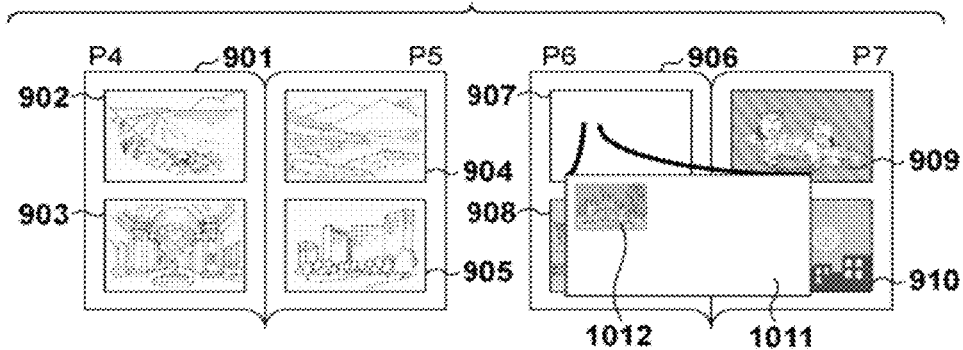
F I G. 11D
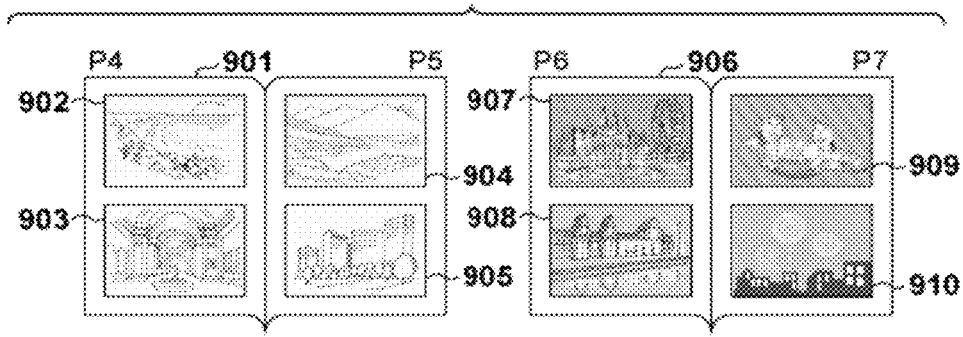

IMAGE CAPTURING APPARATUS AND METHOD OF CONTROLLING THE SAME

BACKGROUND OF THE INVENTION

1. Field of the Invention

The present invention relates to an image capturing apparatus for creating an album while capturing images and a method of controlling the same.

2. Description of the Related Art

There has conventionally been proposed a digital camera capable of creating an album by laying out captured images while capturing images.

For example, Japanese Patent Laid-Open No. 2008-017238 discloses a digital camera capable of creating an album by displaying a through image from an imaging unit in one of an image frame of a template provided with a plurality of image frames. Japanese Patent Laid-Open No. 2002-111995 proposes an image editing apparatus that makes an album more attractive by setting an arbitrary image as the background image of the album. Japanese Patent Laid-Open No. 2004-274500 proposes an image capturing apparatus having a function of registering a captured image in an album. This image capturing apparatus can selectively set, by a button operation, a capturing mode for displaying a through image on the display unit as a live view, a reproduction mode for displaying an image file, or an album reproduction mode for displaying an album file.

Conventionally, when editing an album by laying out captured images at desired positions while capturing images, the image capturing apparatus needs to do many operations such as capturing an image, selecting an image frame to insert a captured image, and confirming the layout of the album. Every time the operation is switched, the user needs to operate a specific operation member, resulting in cumbersomeness in the operation of transiting to various modes.

SUMMARY OF THE INVENTION

The present invention has been made in consideration of the aforementioned problems, and realized an image capturing apparatus capable of parallelly executing image capturing and album editing, which can transit to various modes without any cumbersome operation, and a method of controlling the same.

In order to solve the aforementioned problems, the present invention provides an image capturing apparatus comprising: an imaging unit configured to obtain image data by performing an imaging process of an object image; an image storage unit configured to store the image data linked with album data; a layout storage unit configured to store layout information representing a position where the image data linked with the album data is displayed on a page of the album data; an album display unit configured to display an image frame at the position on the page of the album data represented by the layout information; and a designation unit configured to receive a designation of an arbitrary position on the displayed page, wherein when a region outside the image frame is designated, the album display unit displays the image data obtained by the imaging unit on a background of the page as a live view, and the image storage unit stores the image data linked as the background of the page of the album data.

In order to solve the aforementioned problems, the present invention provides an image capturing apparatus comprising: an imaging unit configured to obtain image data by performing an imaging process of an object image; an image storage unit configured to store the image data linked or not linked with album data; a layout storage unit configured to store layout information representing a position where the image data linked with the album data is displayed on a page of the album data; an album display unit configured to display an image frame at the position on the page of the album data represented by the layout information; a designation unit configured to receive a designation of an arbitrary position on the displayed page; and a control unit configured to control to, based on an order of the image frames designated by the designation unit, selectively execute a capturing mode for performing the imaging process by the imaging unit or an image selection mode for selecting at least one of a plurality of image data stored in the image storage unit.

In order to solve the aforementioned problems, the present invention provides a control method of an image capturing apparatus, the method comprising: an imaging step of obtaining image data by performing an imaging process of an object image; an image storage step of storing the image data linked with album data; a layout storage step of storing layout information representing a position where the image data linked with the album data is displayed on a page of the album data; an album display step of displaying an image frame at the position on the page of the album data represented by the layout information; and a designation step of receiving a designation of an arbitrary position on the displayed page, wherein in the album display step, when a region outside the image frame is designated, the image data obtained in the imaging step is displayed on a background of the page as a live view, and in the image storage step, the image data linked as the background of the page of the album data is stored.

In order to solve the aforementioned problems, the present invention provides a control method of an image capturing apparatus, the method comprising: an imaging step of obtaining image data by performing an imaging process of an object image; an image storage step of storing the image data linked or not linked with album data; a layout storage step of storing layout information representing a position where the image data linked with the album data is displayed on a page of the album data; an album display step of displaying an image frame at the position on the page of the album data represented by the layout information; a designation step of receiving a designation of an arbitrary position on the displayed page; and a control step of controlling to, based on an order of the image frames designated in the designation step, selectively execute a capturing mode for performing the imaging process by the imaging step or an image selection mode for selecting at least one of a plurality of image data stored in the image storage step.

According to the present invention, an image capturing apparatus capable of parallelly executing image capturing and album editing can transit to various modes without any cumbersome operation.

Further features of the present invention will become apparent from the following description of exemplary embodiments (with reference to the attached drawings).

BRIEF DESCRIPTION OF THE DRAWINGS

FIG. 2 is a block diagram of the digital camera according to the embodiment;

FIGS. 4A to 4D are views showing an XML source for displaying a template;

FIG. 6 is a flowchart illustrating a background capturing process according to the second embodiment;

FIGS. 11A to 11D are views showing an example of the page layout result in the image selection mode according to the embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

<Arrangement of Digital Camera>

The arrangement of a digital camera 100 according to this embodiment will be described with reference to FIGS. 1A to 2. Note that the digital camera 100 of this embodiment has an image frame capturing mode for capturing an object to be inserted into a designated image frame, a page layout display mode for displaying a preview screen in which the captured image is inserted into the designated image frame, and a background capturing mode for capturing an image to be inserted into the background.

Figure 1A:
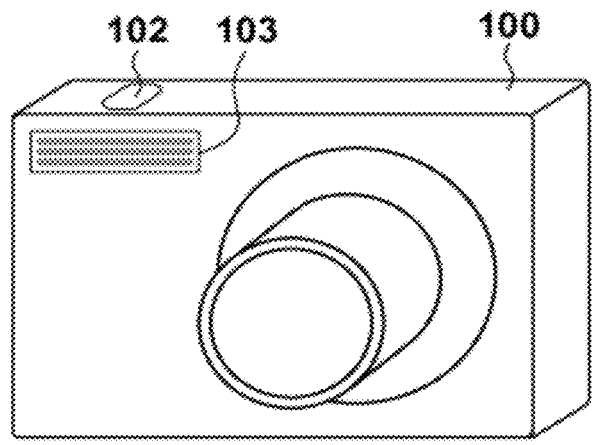
FIG. 1A is a perspective view showing the outer appearance of a digital camera according to an embodiment of the present invention viewed from the front.
Figure 1B:
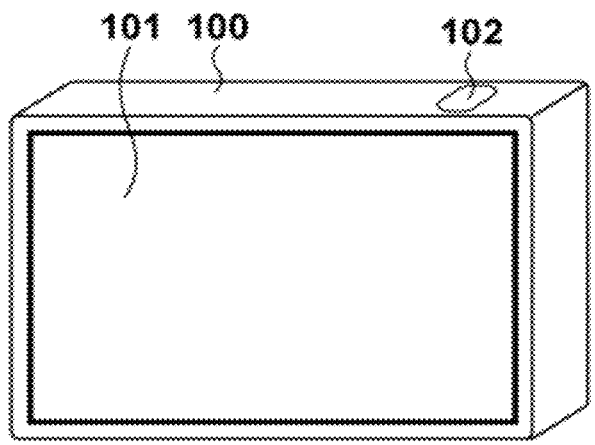
FIG. 1B is a perspective view showing the outer appearance of the digital camera according to the embodiment of the present invention viewed from the back.

Referring to FIGS. 1A and 1B, reference numeral 101 denotes an LCD having a touch panel function; 102, a shutter button; and 103, an electronic flash.

Referring to FIG. 2, a control unit 201 controls the entire digital camera 100. The control unit 201 is formed from, for example, a CPU.

A memory 202 mainly serves as an area to store programs to be executed by the control unit 201, a work area to be used during execution of the programs, and an area to store screen data to be displayed on a display unit 205 to be described later.

A storage unit 203 is formed from, for example, a flash memory or a hard disk and used to store captured still images, templates, and the like. A template includes page layout information of image frames in album data.

An imaging unit 204 converts an analog image signal obtained by imaging an object image into digital data, compresses the data by ADCT (Adaptive Discrete Cosine Transformation) or the like, and outputs it to the memory 202 as image data. The imaging unit 204 also controls zooming, focusing, and aperture adjustment.

The display unit 205 is formed from, for example, a liquid crystal display or an organic EL display.

An operation unit 206 includes, for example, buttons, a 4-way selector, a dial, and a touch panel and instructs the control unit 201 of the contents of a user operation.

Note that the above-described arrangement in FIG. 2 is an example of the embodiment using the image capturing apparatus according to the present invention, and various changes and modifications can be made without departing from the scope of the present invention by, for example, providing a communication unit and a voice output unit.

<Screens of Digital Camera>

Screens to be displayed on the digital camera according to the first embodiment will be explained with reference to FIGS. 3A to 6 in addition to FIGS. 1A to 2.

Figure 3A:
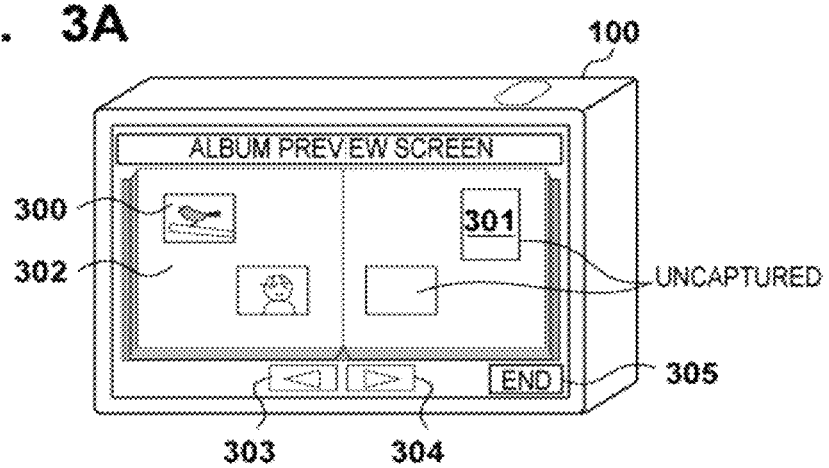
FIG. 3A is a perspective view showing an example of an album preview screen displayed by the digital camera according to the embodiment.

FIG. 3A shows a state in which a preselected album template is displayed in the album preview screen of the digital camera according to this embodiment.

An already captured still image is associated with an image frame 300 on the template currently under the preview. No still image is associated with an uncaptured image frame 301. The user touches the image frame 300 or 301, thereby capturing the still image to be associated with the image frame. Reference numeral 302 denotes a background outside the image frames of the template. The user touches the background region 302, thereby inserting a captured still image into the background.

Reference numerals 303 and 304 denote page return and advance buttons of the template. The user can turn the pages of the template by touching the page return and advance buttons 303 and 304. Reference numeral 305 denotes an end button. The user can end the album preview screen by touching the end button.

Figure 3B:
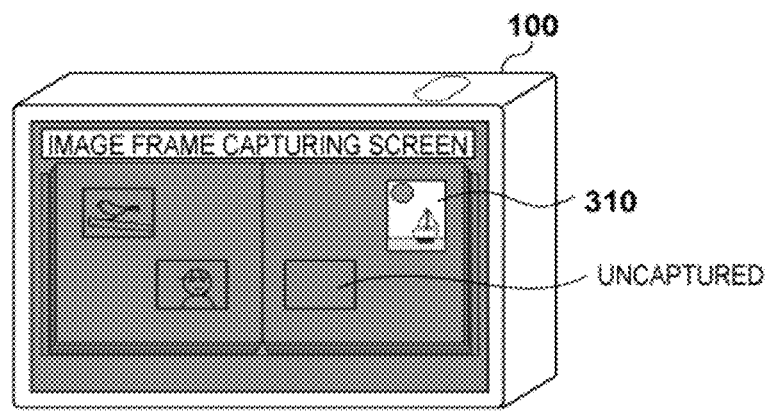
FIG. 3B is a perspective view showing an example of an image frame capturing screen displayed by the digital camera according to the embodiment.

FIG. 3B shows an image frame capturing screen displayed when the user touches the uncaptured image frame 301 as shown in FIG. 3A. A through image is displayed in an image frame 310.

Figure 3C:
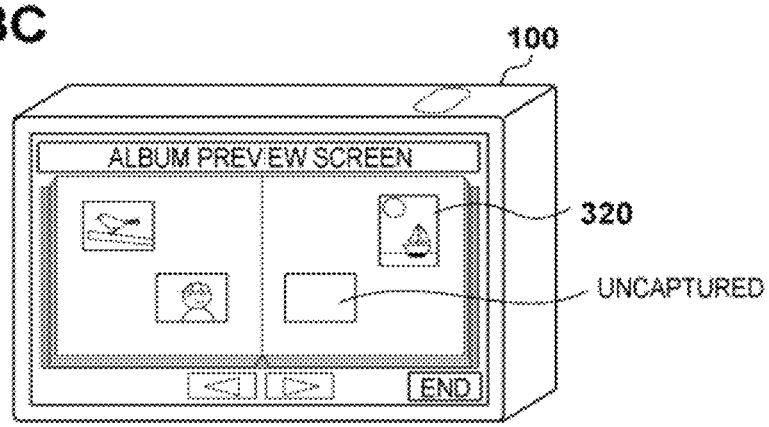
FIG. 3C is a perspective view showing an example of the album preview screen, after image frame capturing, displayed by the digital camera according to the embodiment.

FIG. 3C shows the album preview screen after image frame capturing in FIG. 3B. A captured still image is associated with an image frame 320.

Figure 3D:
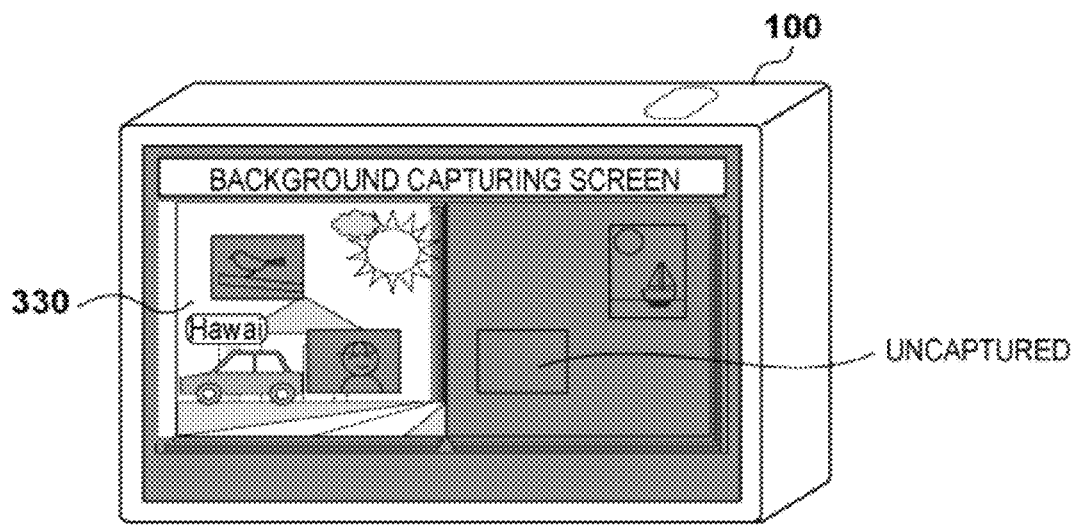
FIG. 3D is a perspective view showing an example of a background capturing screen displayed by the digital camera according to the embodiment.

FIG. 3D shows a background capturing screen displayed when the user touches the background 302 as shown in FIG. 3A. A through image is displayed in a background 330.

Figure 3E:
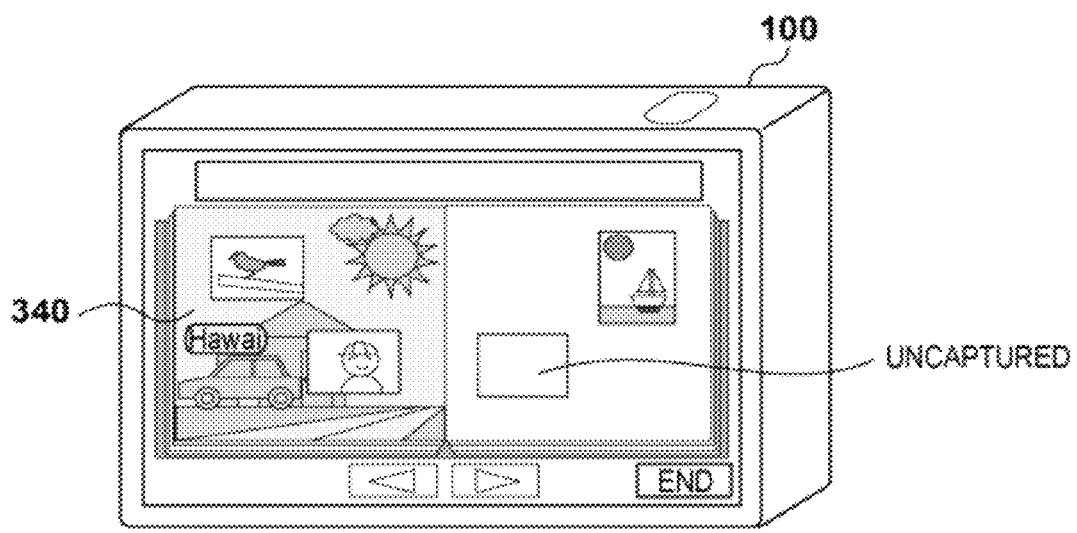
FIG. 3E is a perspective view showing an example of the album preview screen, after background capturing, displayed by the digital camera according to the embodiment.

FIG. 3E shows the album preview screen after background capturing in FIG. 3D. A captured still image is inserted into a background 340.

FIG. 4A shows a detailed XML source for displaying the album template shown in FIG. 3A.

A tag 410 represents the title of the template.

A tag 411 represents a page break. "locate" represents the left or right side of the double-page spread of the album.

A tag 412 associates the background image of the page. In this tag, "brightness" is a parameter representing the brightness of the associated image, and "mode" is a parameter representing the image processing method of the associated image. Details will be described later.

Tags 413 and 414 represent image frames on the template. In these tags, "x" and "y" represent coordinates on the page, and "height" represents the display size of the associated image. A still image IMG_0029.JPG is associated with the tag 413. The tag 414 represents an uncaptured image frame with which no through image is associated.

FIG. 4B shows the template displayed in FIG. 3C.

A tag 420 represents an image frame with which the image 320 is associated in FIG. 3C.

FIG. 4C shows the template displayed in FIG. 3E.

A tag 430 represents a background in which the image 340 is inserted in FIG. 3E.

In this embodiment, the XML is used as the template description language. However, the present invention is not limited to this. The present invention can be practiced by any other description language necessary and sufficient for expressing the template.

<Operation of Digital Camera>

The album creation process of the digital camera according to this embodiment will be described with reference to FIG. 5A.

Note that the following process is implemented by causing the control unit 201 to expand, on the memory 202, the programs stored in the storage unit 203 and execute the programs.

Figure 5A:
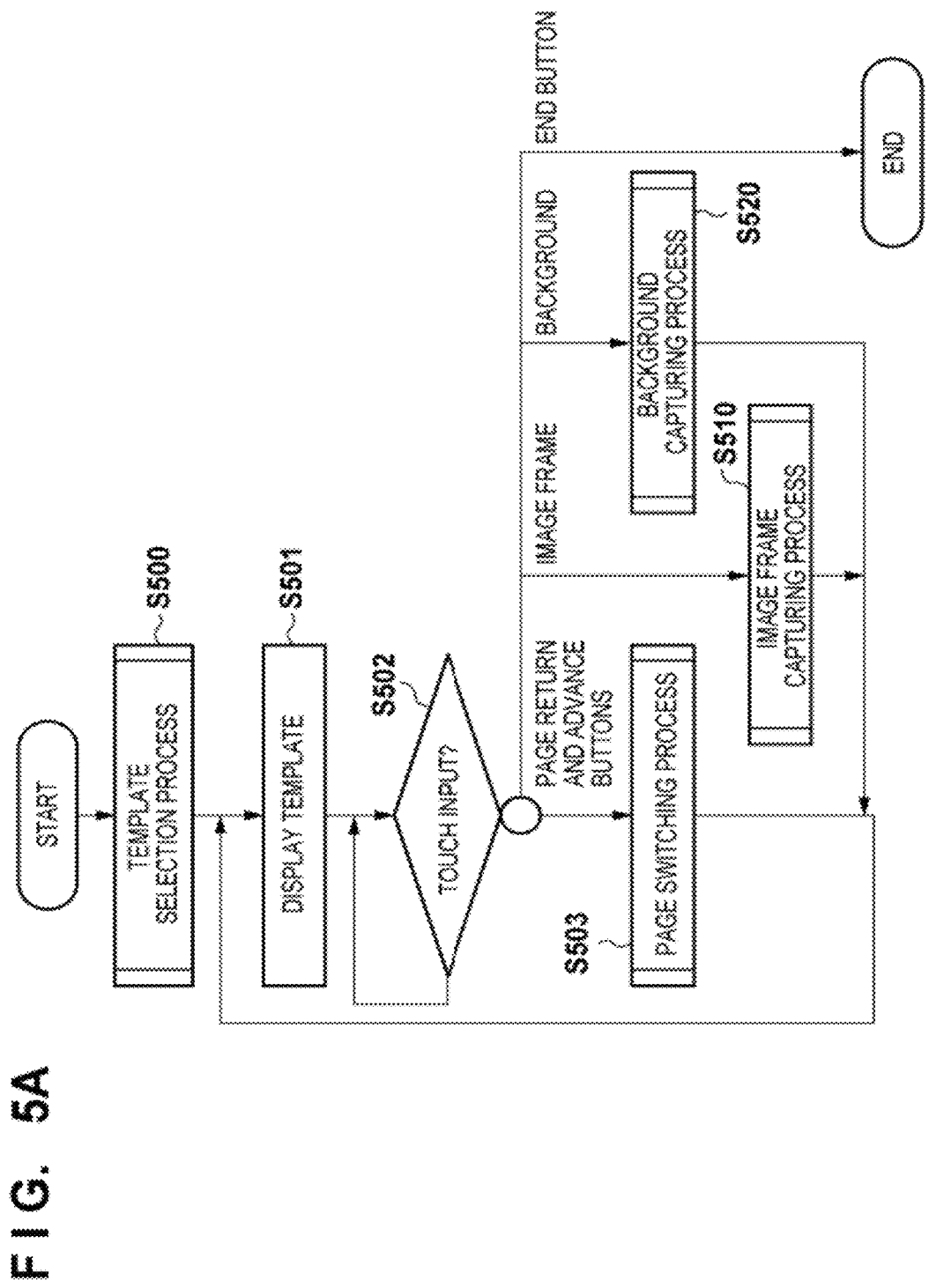
FIG. 5A is a flowchart illustrating the album creation process of the digital camera according to the embodiment.

Referring to FIG. 5A, in step S500, the control unit 201 performs a template selection process (not shown). In the template selection process, the control unit 201 displays, on the display unit 205, a list of templates stored in the storage unit 203, prompts the user to select a template to be displayed now, and obtains the user selection result from the operation unit 206. The control unit 201 also reads out the selected template from the storage unit 203, stores it in the memory 202, and stores the page numbers of the first two pages in the memory 202 as the preview display page numbers.

In step S501, the control unit 201 displays, as the album preview screen on the display unit 205, two pages to be displayed with the preview display page numbers of the template stored in the memory 202. FIG. 3A shows an example of the display result.

In step S502, the control unit 201 waits for user's touch input on the screen that is instructed from the operation unit 206. If the touch input is on the page return button 303 or the page advance button 304, the process advances to step S503.

In step S503, the control unit 201 performs a page switching process (not shown) and returns to step S501. In the page switching process, the control unit 201 reads out the preview display page numbers stored in the memory 202, and subtracts 2 for the page return button 303 or adds 2 for the page advance button 304 to update the preview display page numbers in the memory 202.

If the touch input in step S502 is on the image frame 300 or 301, the control unit 201 performs an image frame capturing process in step S510.

The image frame capturing process of step S510 will be explained here with reference to FIG. 5B.

Figure 5B:
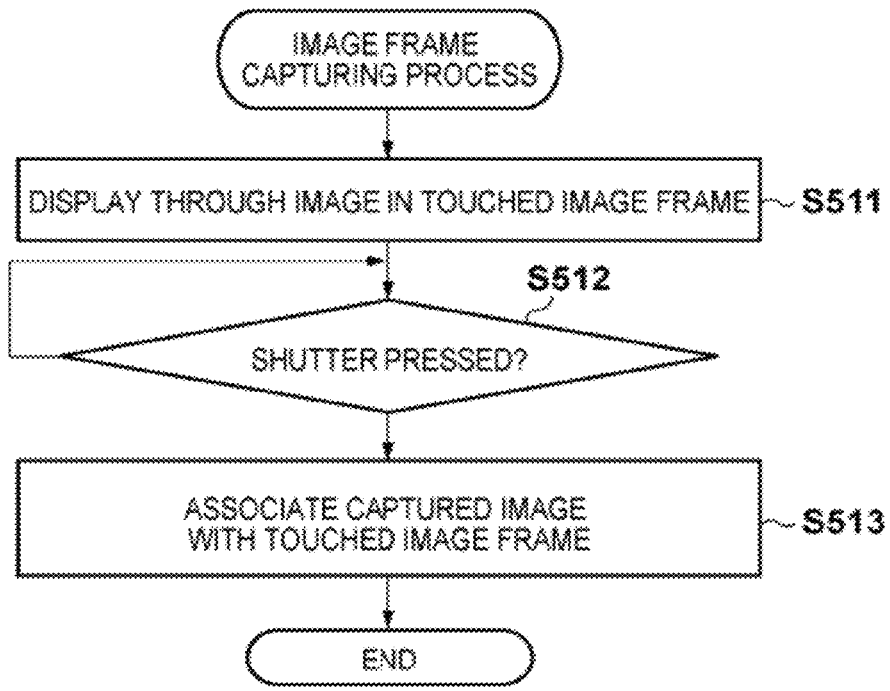
FIG. 5B is a flowchart illustrating the image frame capturing process of the digital camera according to the embodiment.

Referring to FIG. 5B, in step S511, the control unit 201 displays, as a through image, image data obtained from the imaging unit 204 in the image frame that is the target of the touch input. FIG. 3B shows an example of the display result.

In step S512, the control unit 201 waits for press of the shutter button 102 instructed from the operation unit 206. Upon receiving the instruction of press of the shutter button 102 from the operation unit 206, the control unit 201 advances to step S513.

In step S513, the control unit 201 stores image data output from the imaging unit 204 to the memory 202 in the storage unit 203 as a still image. The control unit 201 updates the template in the storage unit 203 so as to associate the still image with the image frame where the through image is displayed in step S511. FIG. 4A shows the template before update, and FIG. 4B shows that after update.

After the image frame capturing process is executed in step S510, the process returns to step S501. FIG. 3C shows an example of the screen display in step S501 after the image frame capturing process.

If the touch input in step S502 is on the background 302, the control unit 201 performs a background capturing process in step S520.

Figure 5C:
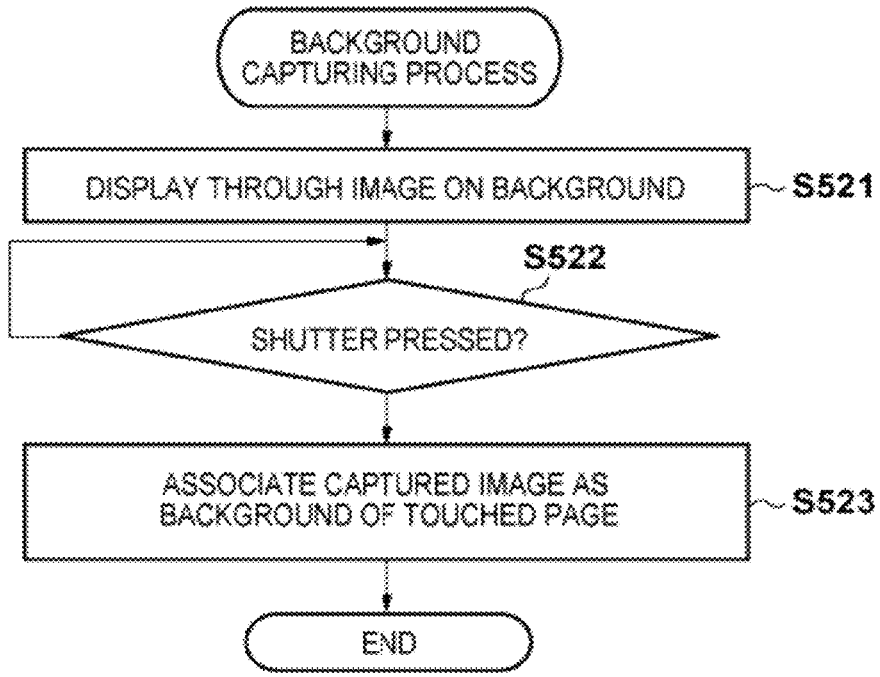
FIG. 5C is a flowchart illustrating the background capturing process of the digital camera according to the embodiment.

The background capturing process of step S520 will be explained here with reference to FIG. 5C. Referring to FIG. 5C, in step S521, the control unit 201 displays, as a through image, image data obtained from the imaging unit 204 on the background of the page that is the target of the touch input. FIG. 3D shows an example of the display result.

In step S522, the control unit 201 waits for press of the shutter button 102 instructed from the operation unit 206. Upon receiving the instruction of press of the shutter button 102 from the operation unit 206, the process advances to step S523.

In step S523, the control unit 201 stores image data output from the imaging unit 204 to the memory 202 in the storage unit 203 as still image data. The control unit 201 updates the template in the storage unit 203 so as to link the still image with the background of the page where the through image is displayed in step S521. FIG. 4B shows the template before update, and FIG. 4C shows that after update. The user captures an image after setting the through image displayed on the background of the template in a suitable composition in consideration of the position and size of the image frame on the template, thereby obtaining an attractive album with a background image inserted.

After the background capturing process is executed in step S520, the process returns to step S501. FIG. 3E shows an example of the screen display in step S501 after the background capturing process.

If the touch input in step S502 is on the end button 305, the control unit 201 ends the process.

Second Embodiment

In the first embodiment, an example has been described in which when the user touches the background during preview display of a template, a through image is displayed on the background to enable capture a still image, and the captured still image can be inserted into the template as a background image. In the first embodiment, however, to insert the background image into each of a plurality of pages of the template, the user performs background touch and capturing for each page. However, the user may be able to set the background of the plurality of pages by touching the background and capturing the image only once.

In the first embodiment, the user cannot set how to process the still image to be inserted as the background image. However, the user may be able to set the contents of an image process to be executed for the background image in accordance with the template or the image frame layout.

These cases will be described as the second embodiment with reference to FIGS. 3A to 6 in addition to FIGS. 1A to 2. Note that the second embodiment is the same as the first embodiment except FIGS. 3F to 3I, 4D, and 6, and a description thereof will be omitted. The arrangement of a digital camera 100 is the same as that shown in FIGS. 1A to 2.

Figure 3F:
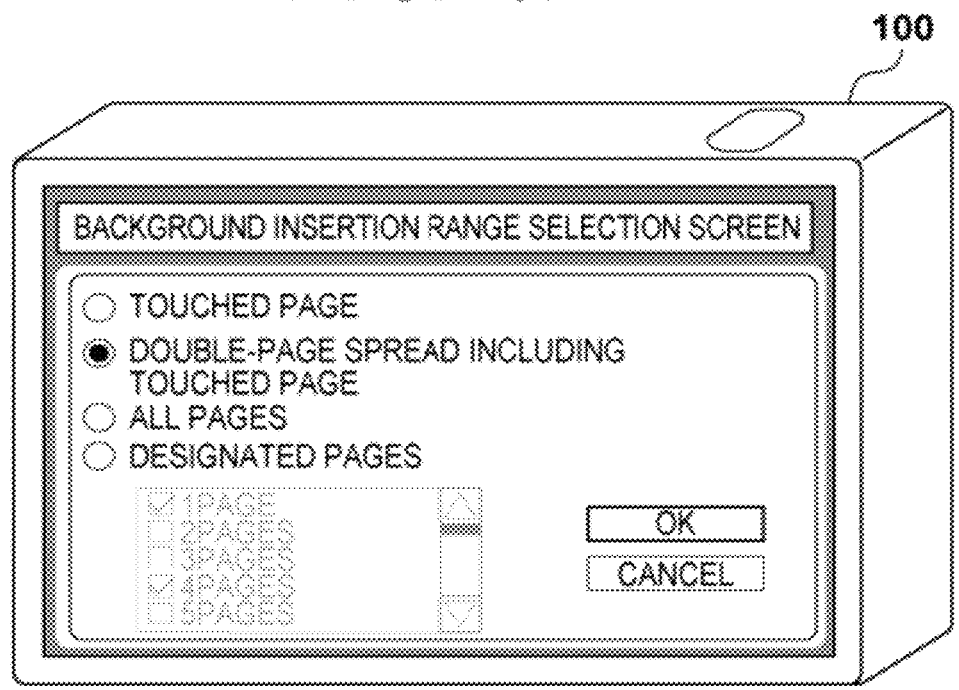
FIG. 3F is a perspective view showing an example of a background insertion range selection screen displayed by the digital camera according to the embodiment.

FIG. 3F shows a background insertion range selection screen displayed when the user touches a background 302 in FIG. 3A. This screen allows the user to select a page in which a still image to be captured now is inserted.

Figure 3G:
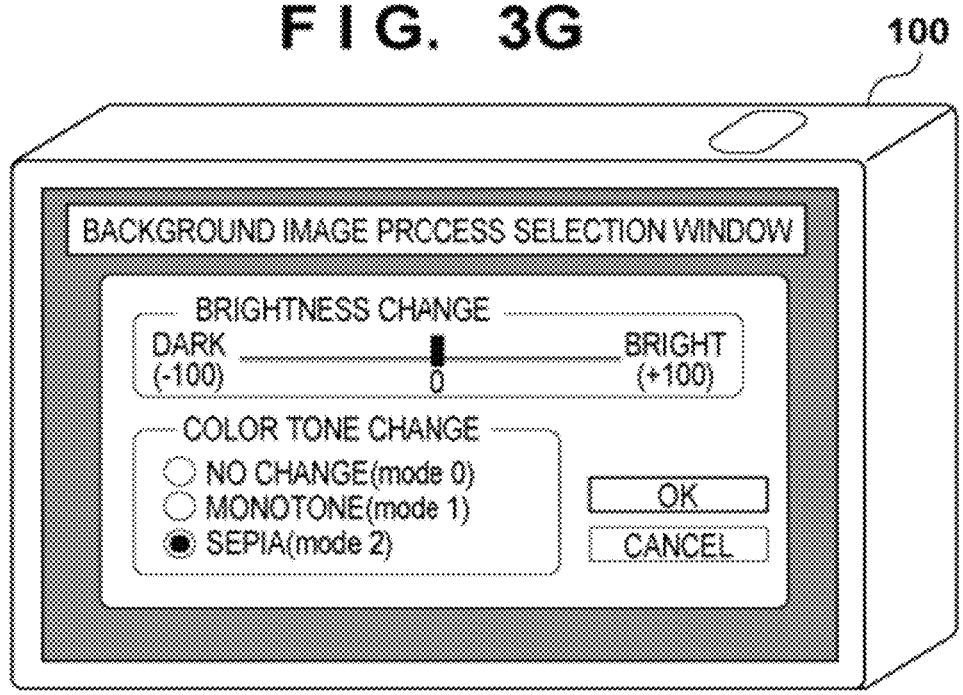
FIG. 3G is a perspective view showing an example of a background image process selection screen displayed by the digital camera according to the embodiment.

FIG. 3G shows an example of a background image process selection screen displayed next to the background insertion range selection screen in FIG. 3F. This screen allows the user to select how to process the still image to be captured now and inserted as a background.

Figure 3H:
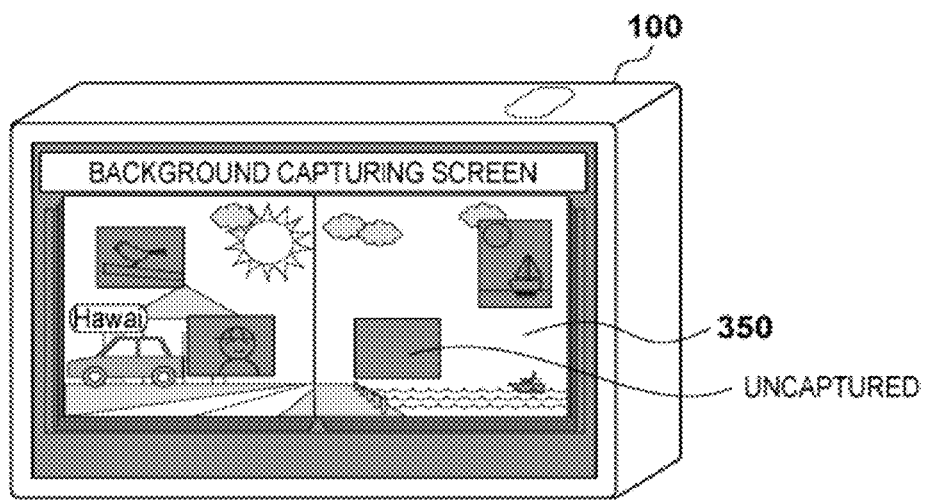
FIG. 3H is a perspective view showing an example of the background capturing screen of a double-page spread displayed by the digital camera according to the embodiment.

FIG. 3H shows a background capturing screen when "double-page spread of touched page" is selected in the background insertion range selection screen shown in FIG. 3F. Reference numeral 350 denotes a background on which a through image is displayed across the left and right pages of the album.

Figure 3I:
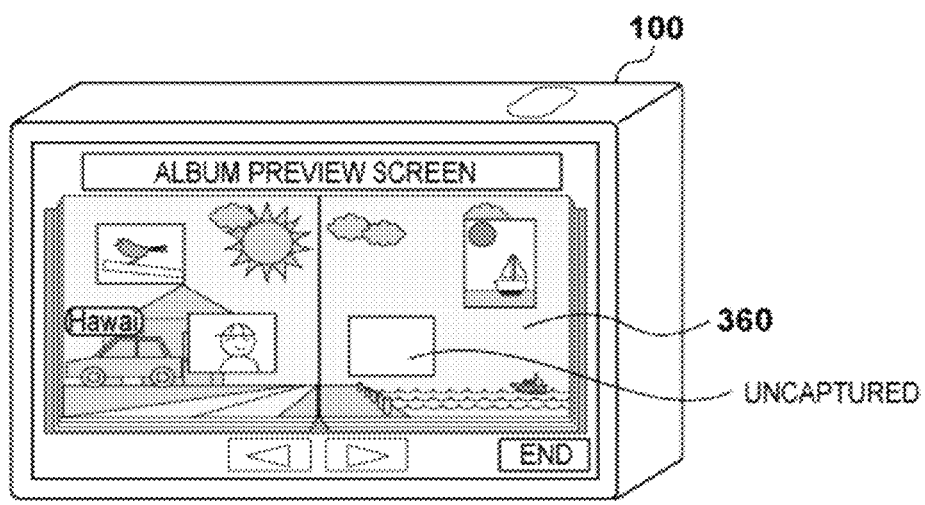
FIG. 3I is a perspective view showing an example of the album preview screen, after background capturing of the double-page spread, displayed by the digital camera according to the embodiment.

FIG. 3I shows the album preview screen after image capturing when the user selects "sepia (mode 2)" as "color tone change" without selecting "brightness change" (that is, 0) in the background image process selection screen in FIG. 3G. Reference numeral 360 denotes a background in which a captured still image is processed and inserted.

FIG. 4D shows the template displayed in FIG. 3I.

Referring to FIG. 4D, a "brightness" 440 represents the brightness of the background and is set to "0" representing that the background brightness does not change. A "mode" 441 represents an image processing method for the associated image and is set to "2" representing that the image processing method is "sepia (mode 2)". A "pagespan" 442 represents how many pages receive the background image by this tag and is set to "2" representing that the background image is inserted into two pages.

The background capturing process in the album creation process (FIG. 5A) of the digital camera according to this embodiment will be described here with reference to FIG. 6.

Note that the following process is implemented by causing a control unit 201 to expand, on a memory 202, the programs stored in a storage unit 203 and execute the programs.

Referring to FIG. 6, in step S601, the control unit 201 displays the background insertion range selection screen on a display unit 205 and prompts the user to select a page in which a still image to be captured now is inserted. FIG. 3F shows an example of the background insertion range selection screen.

In step S602, the control unit 201 waits for user's touch input on the OK button that is instructed from an operation unit 206. Upon receiving the instruction of the touch input on the OK button from the operation unit 206, the control unit 201 stores, as insertion range information in the memory 202, the information of pages selected by the user which is obtained from the operation unit 206 and in which the still image to be captured now is inserted.

In step S603, the control unit 201 displays the background process content selection screen on the display unit 205 and prompts the user to select the contents of an image process to be executed for the still image to be captured now. FIG. 3G shows an example of the background process content selection screen.

In step S604, the control unit 201 waits for user's touch input on the OK button that is instructed from the operation unit 206. Upon receiving the instruction of the touch input on the OK button from the operation unit 206, the control unit 201 stores the information of brightness change and color tone change obtained from the operation unit 206 in the memory 202 as background image process information.

In step S605, if the insertion range information held in the memory 202 indicates "double-page spread including the touched page", the control unit 201 displays, as a through image, image data output from an imaging unit 204 on the background of the successive pages of the preview display page numbers held in the memory 202. Otherwise, the control unit 201 displays, as a through image, the image data output from the imaging unit 204 on the background of the page that is the target of the touch input. The control unit 201 executes an image process according to the contents of the background image process information stored in the memory 202 for the displayed through image, and displays it. FIG. 3H shows an example of the background capturing screen when the insertion range information indicates "double-page spread including the touched page".

In step S606, the control unit 201 waits for press of a shutter button 102 instructed from the operation unit 206. Upon receiving the instruction of press of the shutter button 102 from the operation unit 206, the control unit 201 advances to step S607.

In step S607, the control unit 201 stores the image data output from the imaging unit 204 to the memory 202 in the storage unit 203 as a still image. The control unit 201 updates the template in the storage unit 203 so as to associate the still image with the "background" tag of the page corresponding to the insertion range information stored in the memory 202. At this time, the "brightness" parameter and the "mode" parameter of the "background" tag are added in accordance with the background image process information stored in the memory 202. FIG. 4B shows the template before update, and FIG. 4D shows that after update.

The first and second embodiments are not always limited to those described above and may partially be changed in the following way.

(1) In this embodiment, four different choices "touched page", "double-page spread including the touched page", "all pages", and "designated pages" are adopted concerning selection of the background insertion range. However, the present invention is not limited to this. If the pages in which the background is inserted can be specified, various kinds of options and designation methods other than those described above can be adopted.

(2) As the image processes to be executed for a background image, "brightness change" and "color tone change" are adopted. However, the present invention is not limited to this. Various other kinds of image processes that are executable for the background image to create an attractive album can be adopted.

(3) In the second embodiment, selection of the background insertion range and selection of the image process to be executed for the background image are received. However, the embodiment may be changed to receive only one of them.

(4) In the second embodiment, selection of the background insertion range and selection of the image process to be executed for the background image are received when a background position designation is received. However, they may be received after the still image to be inserted as the background image is captured. That is, the processes of steps S601 to S604 of FIG. 6 may be executed between step S606 and step S607 of FIG. 6.

Third Embodiment

The third embodiment will be described next. A digital camera 100 of this embodiment has an image selection mode for selecting an existing image to be inserted into a designated image frame in addition to the image frame capturing mode and the page layout display mode.

Note that the arrangement of the digital camera 100 of this embodiment is the same as that shown in FIGS. 1A to 2 except that a 4-way selector 104 is provided on the back surface of the main body of the apparatus. Note that in the third embodiment, not the 4-way selector but a touch panel may be used for the operation as in the above-described embodiments.

Figure 7A:
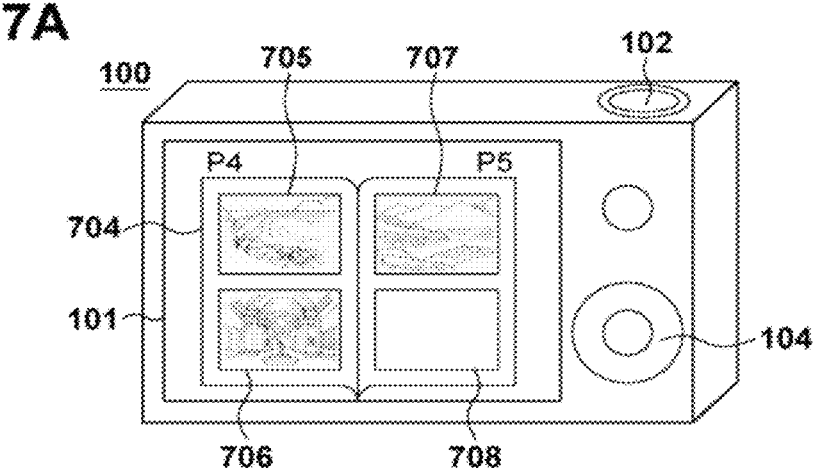
FIG. 7A is a perspective view showing an example of the album display mode of a digital camera according to the third embodiment.
Figure 7B:
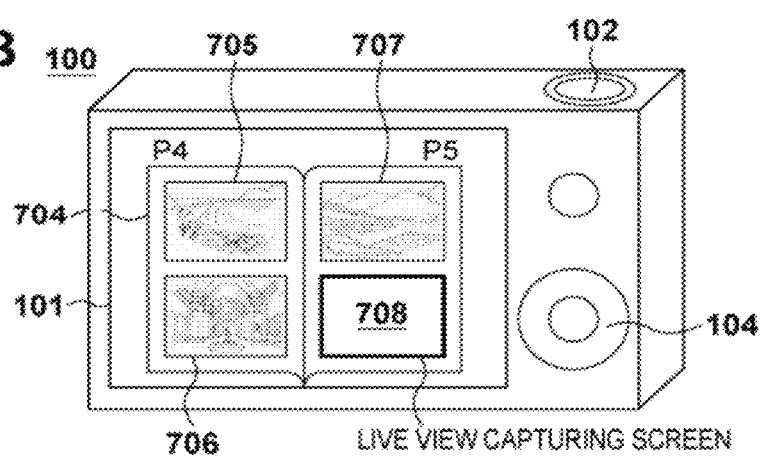
FIG. 7B is a perspective view showing an example of the image frame capturing mode of the digital camera according to the third embodiment.
Figure 7C:
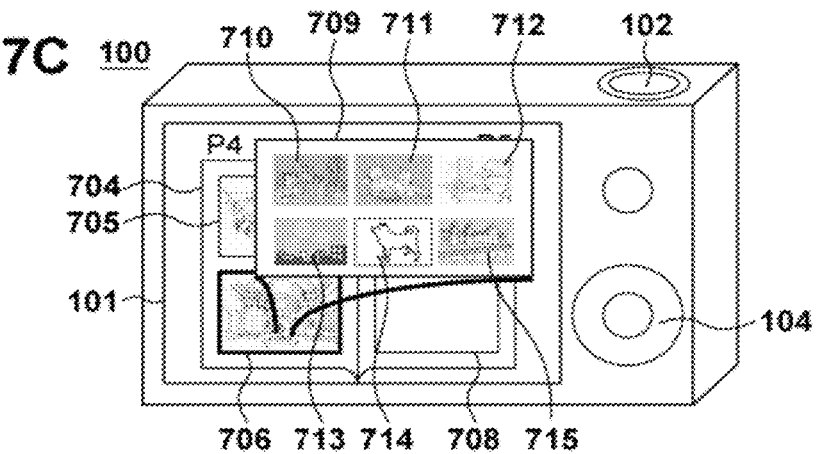
FIG. 7C is a perspective view showing an example of the image selection mode of the digital camera according to the third embodiment.

FIG. 7A shows the album display mode. FIG. 7B shows the image frame capturing mode. FIG. 7C shows the image selection mode.

FIG. 7A shows the album display mode of this embodiment. Album data 704 is displayed on an LCD 101. In this embodiment, out of a plurality of pages included in the album, a double-page spread is displayed. P4 and P5 displayed on the upper left and upper right portions of the album data 704 represent the orders of the pages included in the album. Reference numerals 705 to 708 denote image frames laid out on the pages P4 and P5 of the album data.

Referring to FIG. 7A, image data are already inserted into the image frames 705 to 707. The image frame 708 is the latest image frame in which no image data is inserted yet. Note that in this album data, the image frames 705 to 708 are assigned predetermined sequence numbers. Note that the image frames of all pages of one album are assigned consistent unique sequence numbers.

FIG. 7B shows the image frame capturing mode of the digital camera 100. The image frame 708 in FIG. 7B displays a through image obtained by an imaging unit 204 in real time as a live view. When a shutter button 102 is pressed, image data is generated based on the through image displayed in the image frame 708 and recorded in association with the image frame 708. This allows to insert image data desired by the user into the image frame.

FIG. 7C shows the image selection mode. Referring to FIG. 7C, reference numeral 709 denotes an image candidate window 709 in which image data 710 to 715 are read out from a memory card to be described later and displayed as candidates that can be inserted into the image frame 706. The image candidates 710 to 715 are displayed in the order of captured time. When the user selects one of the image candidates 710 to 715 using a touch panel unit arranged on the LCD 101, the selected image data is inserted into the image frame 706.

Figure 8:
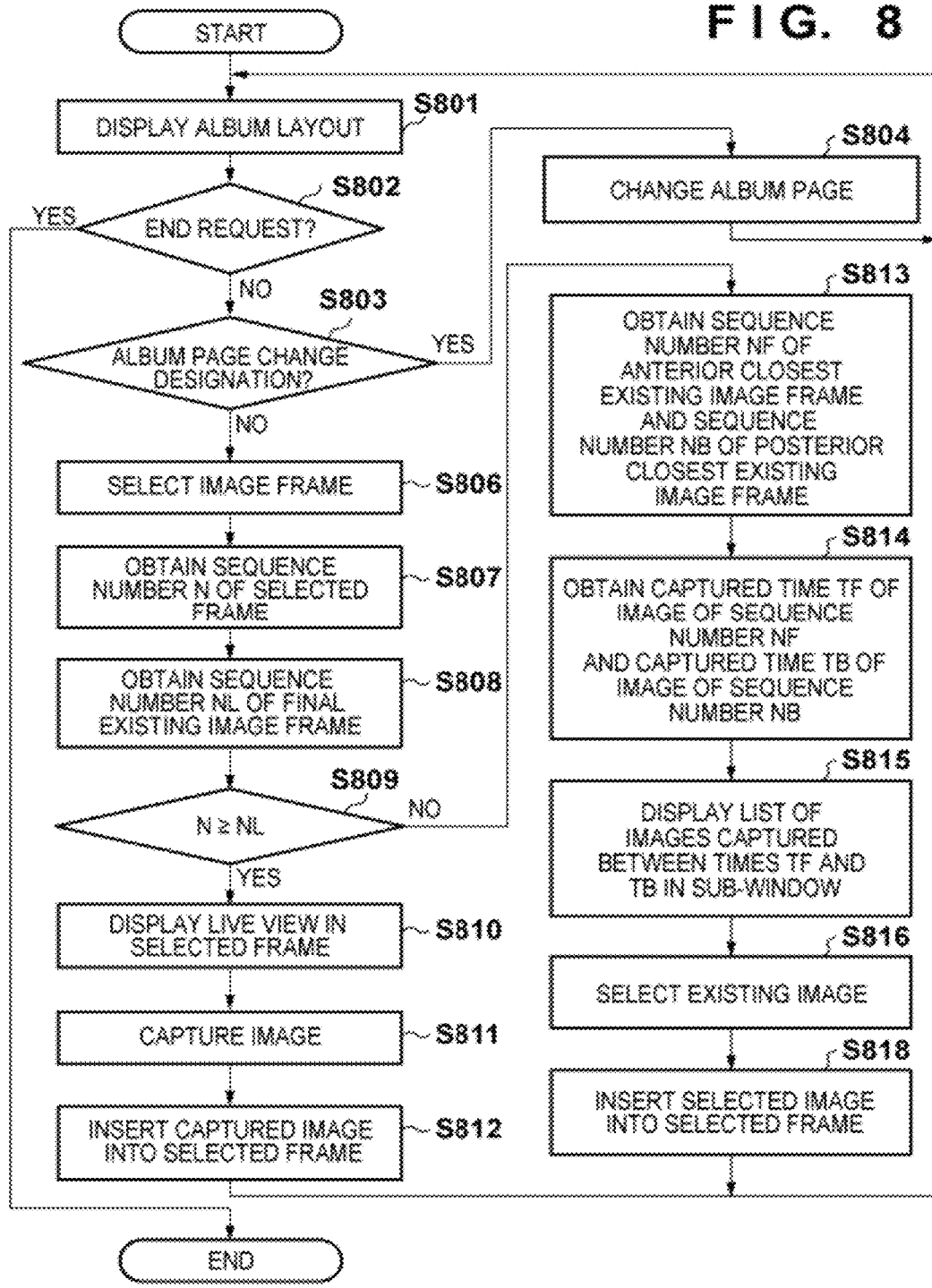
FIG. 8 is a flowchart illustrating the album creation process of the digital camera according to the third embodiment.
Figure 9A:
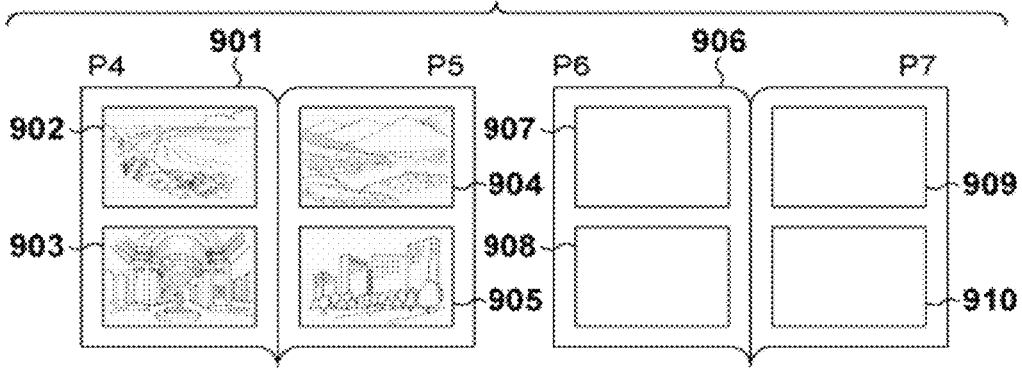
FIGS. 9A to 9C are views showing an example of the page layout result in the image frame capturing mode according to the embodiment.
Figure 9B:
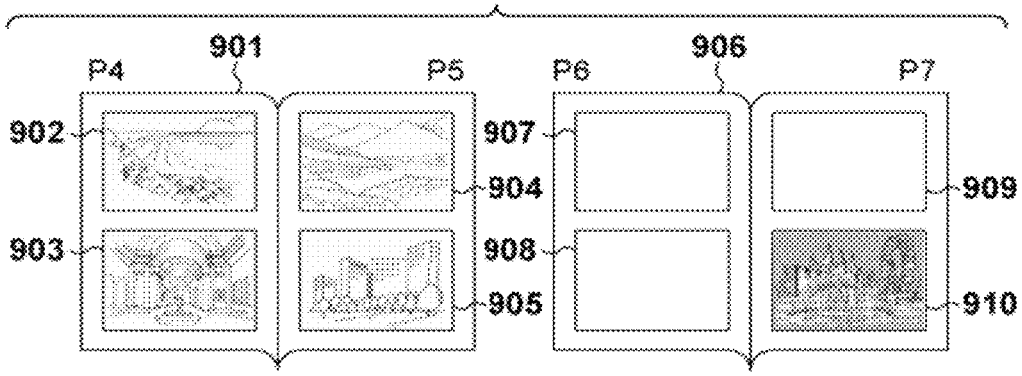
Figure 9C:
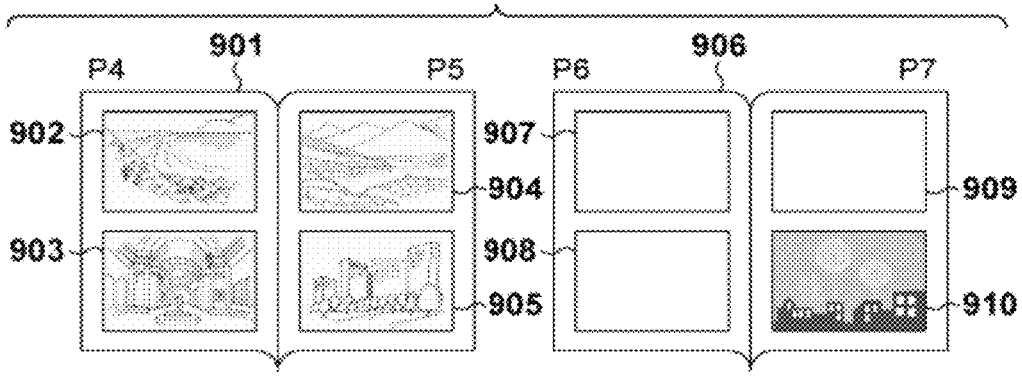

FIG. 8 is a flowchart illustrating the album creation process according to the third embodiment. FIGS. 9A to 9C show an example of the page layout result in the image frame capturing mode according to this embodiment. FIGS. 10A and 10B and FIGS. 11A to 11D show examples of the page layout result in the image selection mode according to this embodiment.

Note that the following process is implemented by causing a control unit 201 to expand, on a memory 202, the programs stored in a storage unit 203 and execute the programs.

Referring to FIG. 8, at the start of the album creation process, the page switching process is done in step S503 of FIG. 5A, and the two pages P4 and P5 of the spread are displayed in the initial album data state, as shown in FIG. 9A. All image frames from an image frame 910, that is, all image frames from P8 on the album are blank image frames without image data inserted.

In step S801, the control unit 201 displays a page layout 901 on the LCD 101.

In step S802, upon receiving a predetermined end request by a user operation, the control unit 201 ends the process. If no end request is received, the process advances to step S803.

In step S803, when the user operates the left and right buttons of the 4-way selector 104, the control unit 201 advances to step S804 to change the page layout 901. When the user presses the right button of the 4-way selector 104, the page layout 901 displayed on the LCD 101 switches to a page layout 906 including the data of pages P6 and P7 of the album.

After that, the process returns to step S801. Without the operation of the 4-way selector 104, the process advances to step S806, and the control unit 201 selects an image frame. To select an image frame, the user touches, through the touch panel included in an operation unit 206 of the digital camera 100, the image frame displayed on the LCD 101. With this process, the image frame 910 shown in FIG. 9A is displayed.

When the image frame is selected in step S806, the control unit 201 obtains a sequence number N assigned to the selected image frame 910, and holds it in the memory 202 in step S807.

In step S808, the control unit 201 obtains a sequence number NL of the final existing image frame. The final existing image frame means an image frame having an image already inserted and a sequence number with the maximum value out of all the image frames in the album data. In this case, an image frame 905 corresponds to the final existing image frame. The sequence number NL of the image frame 905 is held in the memory 202. In step S809, the control unit 201 compares the sequence numbers N and NL with each other.

When the image frame 910 is selected in FIG. 9A, the sequence number N of the image frame 910 is compared with the sequence number NL of the image frame 905. Hence, the determination result of step S809 is YES, and the process advances to step S810.

In step S810, the image frame 910 switches to display of a through image, as shown in FIG. 9B. The user presses the shutter button 102 in an arbitrary composition. The captured image data is stored in the storage unit 203 (step S811). In step S812, the album data is updated to insert the captured image into the image frame 910, as shown in FIG. 9B. After that, the process returns to step S801 to display the album layout.

Assume that the image frame 910 is selected again in step S806 from the state shown in FIG. 9B. In this case, N is the sequence number of the image frame 910 (step S807), and NL is the sequence number of the image frame 910, too (step S808). At this time, N=NL. Hence, the determination result of step S809 is YES, and the process advances to step S810.

After that, in steps S810 to S812, new image data is stored in the storage unit 203, and the image is inserted into the image frame 910. The image data previously inserted into the image frame 910 remains in the storage unit 203 but does not exist on the album.

FIG. 9C shows the state after the above-described operation of selecting the image frame 910 and capturing an image is repeated four times.

The process returns to step S801 again. After executing the same processes as described above, the process advances to step S806. The LCD 101 displays the page layout 906 shown in FIG. 9C. When an image frame 909 is selected in this state, the process advances to step S807 to hold the sequence number of the image frame 909 as N. In step S808, the sequence number of the image frame 910 is held as NL. In step S809, since N<NL, the determination result is NO, and the process advances to step S813.

In step S813, the control unit 201 detects an anterior closest existing image frame and a posterior closest existing image frame. The anterior closest existing image frame is an image frame with an already inserted image, which is located before the selected image frame and has a sequence number closest to the sequence number of the selected image frame. The posterior closest existing image frame is an image frame with an already inserted image, which is located after the selected image frame and has a sequence number closest to the sequence number of the selected image frame. In FIG. 9C, the image frame 905 is the anterior closest existing image frame having a sequence number NF. In addition, the image frame 910 is the posterior closest existing image frame having a sequence number NB.

In step S814, the control unit 201 obtains a captured time TF of the image of the image frame 905 corresponding to the sequence number NF.

In this embodiment, metadata added to image data contains shooting time information, and the captured time is obtained and held in the memory 202. Similarly, the control unit 201 holds, in the memory 202, a captured time TB of the image of the image frame 910 corresponding to the sequence number NB.

Figure 10A:
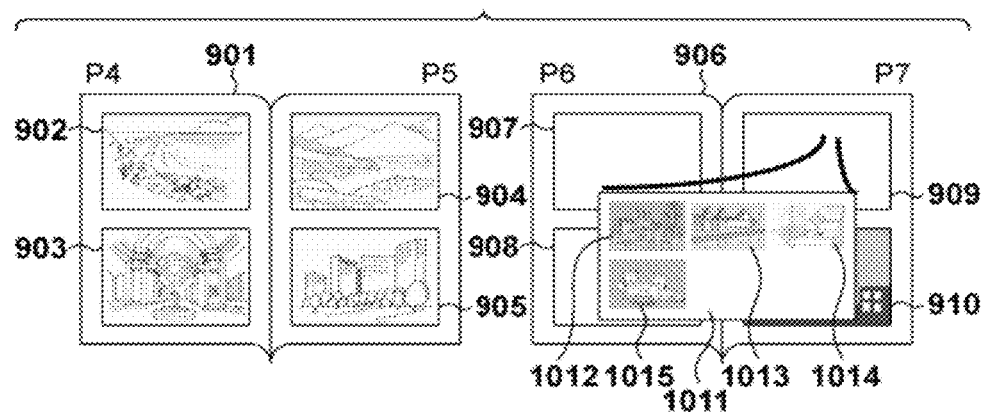
FIGS. 10A and 10B are views showing an example of the page layout result in the image selection mode according to the embodiment.
Figure 10B:
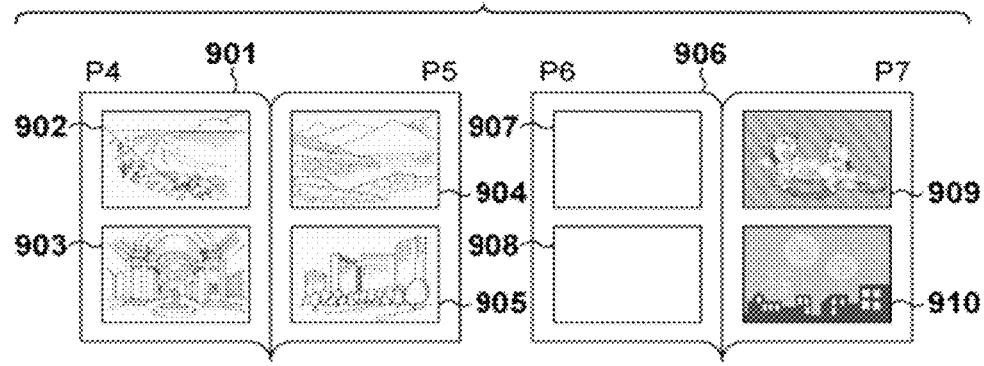

In step S815, the control unit 201 obtains the shooting time information of all image data stored in the storage unit 203, and selects images captured from the time TF to TB out of the obtained captured times. The images selected in step S815 are selectably displayed in a candidate image window 1011 serving as a sub-window, as shown in FIG. 10A. Images 1012 to 1015 displayed in the candidate image window 1011 of FIG. 10A correspond to four images captured before capturing of the images inserted in FIGS. 5A to 5C. The images 1012 to 1015 are arrayed time-serially in the chronological order of the shooting time. When the image 1015 is selected in the state shown in FIG. 10A (step S816), the image 1015 is inserted into the image frame 909, and the screen transits to the state shown in FIG. 10B.

FIGS. 11A to 11D show an example of a result obtained when the same image selection process as that for the image frame 909 is executed for image frames 907 and 908.

Figure 11A:
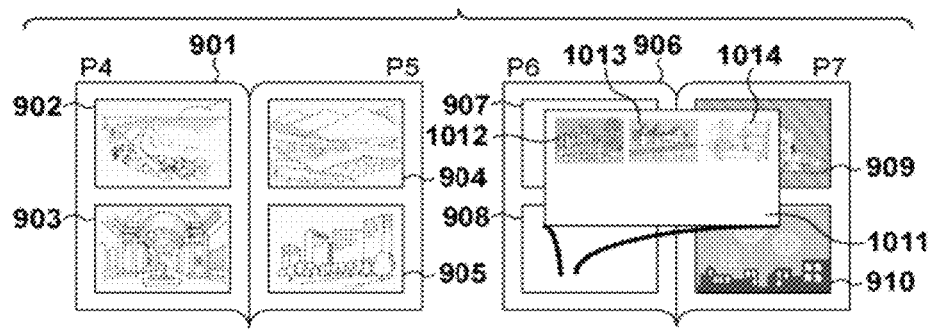
Figure 11B:
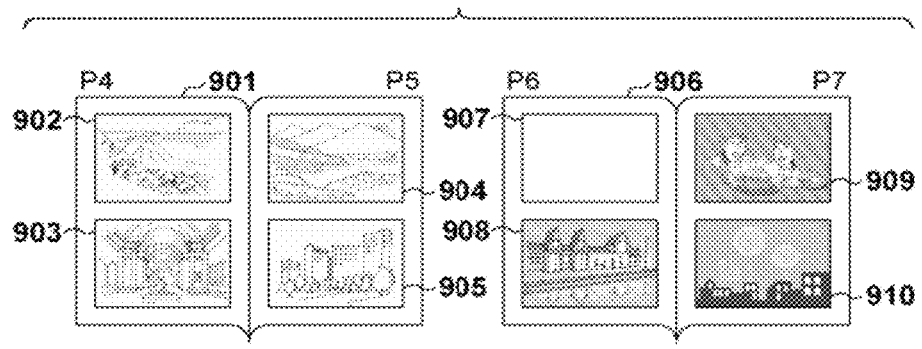

The procedure of the process in FIGS. 11A to 11D will briefly be described below. Referring to FIG. 11A, when the image frame 908 is selected, the screen transits to the image selection mode, and the candidate image window 1011 is displayed. When the image 1013 is selected from the candidate images, the image 1013 is inserted into the image frame 908, as shown in FIG. 11B. When the image frame 907 is selected in this state, the candidate image window 1011 corresponding to the image frame 907 is displayed, as shown in FIG. 11C. Since the image 1013 has previously been selected, the image 1014 captured after the image 1013 is not displayed as the candidate. When the image 1012 is selected in the state shown in FIG. 11C, the image 1012 is inserted into the image frame 907.

In this embodiment, adding time-serial orders to the image frames in the album data based on the shooting time enables easy state transition to the album page layout display mode, the image frame capturing mode, and the image selection mode.

In this embodiment, image candidates may be absent when an existing image frame is selected. In such a case, the user may designate to move up the images inserted in the image frames after the existing image frame one by one while maintaining the time series.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-025336, filed Feb. 8, 2011, which is hereby incorporated by reference herein in its entirety.

What is claimed is:

1. An image capturing apparatus comprising:
   an imaging unit configured to obtain image by performing an imaging process of an object;
   an image storage unit configured to store the image obtained by said imaging unit;
   a frame display unit configured to display an image frame at a position on a page according to layout information representing the position where the image is inserted on the page; and
   a designation unit configured to designate an arbitrary position on the displayed page before said image storage unit stores the image obtained by said imaging unit;
   an inserting unit configured to insert the image obtained by said imaging unit into the image frame corresponding to the position designated by said designation unit,
   wherein when a region outside the image frame is designated, said inserting unit inserts the image obtained by said imaging unit on a background of the page as a live view, and
   said image storage unit stores the image data linked as the background of the page.

2. The apparatus according to claim 1, further comprising a setting unit configured to, when said designation unit receives the designation of the region outside the image frame, set at least one of the contents of an image process to be executed for the image data stored as the background and a page to be linked with the image data out of a plurality of pages.

3. The apparatus according to claim 2, wherein said setting unit can set at least one of brightness and color tone of the image data as the contents of the image process to be executed for the image data stored as the background.

4. The apparatus according to claim 2, wherein said setting unit can set only a displayed page, a double-page spread, and all pages out of the pages.

5. The apparatus according to claim 1, wherein said designation unit comprises a touch panel, and
the designation of the arbitrary position is done by causing a user to operate the touch panel.

6. A non-transitory computer-readable storage medium storing a program that causes a computer to function as each unit of an image capturing apparatus of claim 1.

7. An image capturing apparatus comprising:
an imaging unit configured to obtain image by performing an imaging process of an object;
an image storage unit configured to store the image obtained by said imaging unit;
a frame display unit configured to display an image frame at a position on a page according to layout information representing the position where the image is inserted on the page;
a designation unit configured to designate one of the image frames on the displayed page; and an inserting unit configured to insert the image obtained by said imaging unit into the image frame designated by said designation unit;
a selection unit configured to select at least one of the plurality of images obtained in a time between shooting time of images inserted in anterior and posterior image frames of the image frame designated by said designation unit and stored in said image storage unit when a sequence number of the image frame designated by said designation unit is before the sequence number of the image frame having the sequence number with the maximum value out of all the image frames having other image already inserted,
wherein said inserting unit inserts the image selected by said selection unit into the image frame designated by said designation unit, instead of the image to be obtained by said imaging unit.

8. A non-transitory computer-readable storage medium storing a program that causes a computer to function as each unit of an image capturing apparatus of claim 7.

9. The apparatus according to claim 7, wherein said imaging unit does not obtain the image, when the sequence number of the image frame designated by said designation unit is before the sequence number with the maximum value out of all the image frames having other image already inserted.

10. The apparatus according to claim 7, wherein said image storage unit stores the image linked or not with a predetermined album data, and
said frame display unit displays the image frame with the image linked with the predetermined album data.

11. A control method of an image capturing apparatus, the method comprising:
an imaging step of obtaining image by performing an imaging process of an object;
an image storage step of storing the image obtained by said imaging unit;
a frame display step of displaying an image frame at a position on a page according to layout information representing the position where the image is inserted on the page; and
a designation step of designating an arbitrary position on the displayed page before said image storage step stores the image obtained in the imaging step;
an inserting step of inserting the image obtained in said imaging step into the image frame corresponding to the position designated in the designation step,
wherein in the inserting step, when a region outside the image frame is designated, the image data obtained in the imaging step is inserted on a background of the page as a live view, and
in the image storage step, the image data linked as the background of the page is stored.

12. A control method of an image capturing apparatus, the method comprising:
an imaging step of obtaining image by performing an imaging process of an object;
an image storage step of storing the image obtained in the imaging step;
a frame display step of displaying an image frame at a position on a page according to layout information representing the position where the image is inserted on the page;
a designation step of designating one of the image frames on the displayed page; and an inserting step of inserting the image obtained in the imaging step into the image frame designated in the designation step;
a selection step of selecting at least one of the plurality of images obtained in a time between shooting time of images inserted in anterior and posterior image frames of the image frame designated in the designation step and stored in the image storage step when a sequence number of the image frame designated in the designation step is before the sequence number of the image frame having the sequence number with the maximum value out of all the image frames having other image already inserted, wherein, in said inserting step, the image selected in said selecting step is inserted into the image frame designated in said designation step, instead of the image to be obtained in the imaging step.

* * * * *